United States Patent Office.

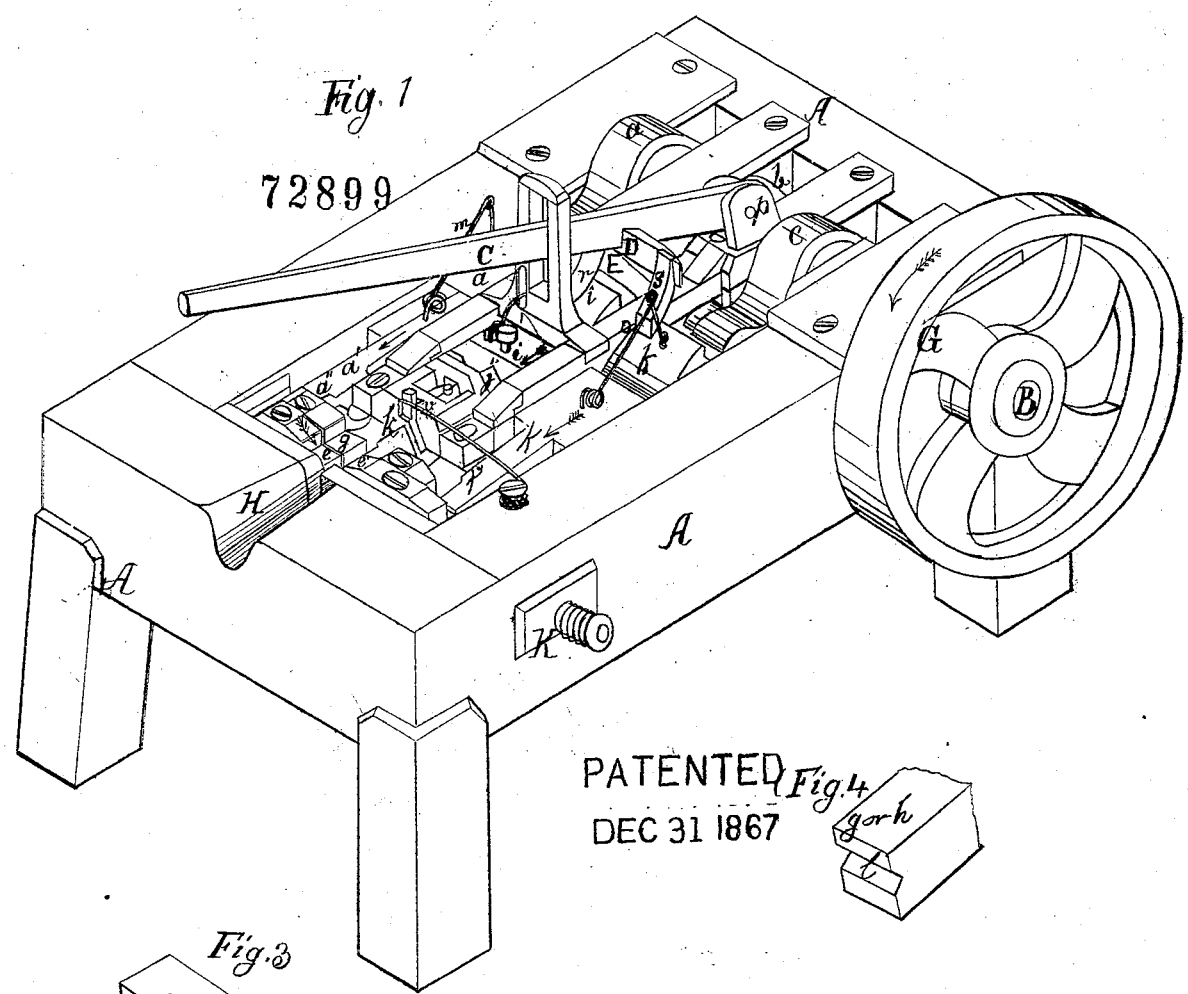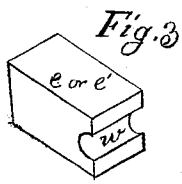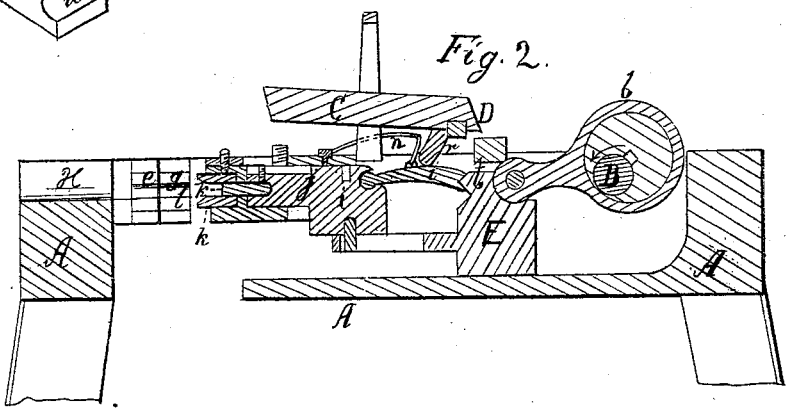

FRANKLIN B. PRINDLE, OF SOUTHINGTON, CONNECTICUT.

Letters Patent No. 72,899, dated December 31, 1867.

---

IMPROVED MACHINE FOR HEADING BOLTS.

---

The Schedule referred to in these Letters Patent and making part of the same.

---

TO ALL WHOM IT MAY CONCERN:

Be it known that I, FRANKLIN B. PRINDLE, of the town of Southington, in the county of Hartford, and State of Connecticut, have invented a new and useful Improvement in Machine for Heading Bolts; and I do hereby declare that the following is a full, clear, and exact description of the construction, character, and operation of the same, reference being had to the accompanying drawings, which make part of this specification, in which—

Figure 1 is a perspective view of the machine complete.

Figure 2 is a longitudinal section of the same, cut vertically through the centre, showing the relative position of the central operating parts or devices.

Figure 3 is a perspective view of one of the holding-dies.

Figure 4 is a perspective view of one of the squaring-dies.

My improvement consists in the use of a pair of holding-dies to hold the bolt, an upsetting-punch to upset the portion designed to be squared, a pair of squaring-dies to square the portion which has been upset, and a plunger or heading-die to form the head, and suitable eccentrics, or other analogous devices, to move or operate the before-mentioned dies or parts, so as to enable me to upset the proper portion of the bolt, form the square on it, and make the head, all with one heat and by one continuous operation of the machine, and to make each side of the square part of the bolt equal to the diameter of the round part.

I make the frame of cast iron, or any other suitable material, substantially in the form represented at A A A, figs. 1 and 2.

I make the main shaft B of iron, or any other suitable material, with three eccentrics, as $a$ $b$ $c$, one of which, $a$, by means of the jointed connection $d$ $d'$, and an inclined plane, (not seen,) serves to give a reciprocating rectilinear motion to the movable holding-die $e$, and $a$, with $c$, by means of the jointed connections $f f'$ and $d$ and $d'$; and two inclined planes, as shown at $d''$ and $f''$, give a reciprocating motion to the two squaring-dies $h$ and $g$, fig. 1; and the middle eccentric $b$, by means of the jointed connection $i$ and $i'$, gives a reciprocating motion to the upsetting-punch or die $j$, and also to the plunger or heading-die $k$; or I use any other analogous means, as cams, knuckle-joints, &c., which, by means of the main shaft B, will produce or cause the necessary motions of the dies, &c.

I make the inner ends of the holding-dies $e$ and $e'$, figs. 1, 2, and 3, with a hollow of about a semicircle, as represented in fig. 3, to hold the bolt-rod while it is being upset; and I have the other, $e'$, fig. 1, firmly or immovably fixed, so that it may serve as a guide while inserting the bolt-rod, and I fit the other holding-die $e$, figs. 1 and 2, so that it may, at the proper time, be moved up by an inclined plane (not seen) at the end of the bar $d'$, or by any other suitable means, so as to grasp the bolt in the two semi-cylindrical spaces in $e$ and $e'$, and hold it with sufficient firmness to be upset by the pressure of the punch $j$, fig. 2.

I make the two squaring-dies, at each of their inner ends, in the form of a hollow square, cut through its diagonal, as represented at $l$, fig. 4, and indicated in fig. 2, so that, when they are forced together by means of suitable inclined planes, one on the bar $d'$, as shown at $d''$, and the other on the bar $f'$, as shown at $f''$, all in fig. 1, they will press or force the enlarged or upset portion of the bolt-rod into a square prism, or make it square in its cross-section, so that each side of the square will be equal to the diameter of the round portion of the bolt, that being the size needed to hold the bolt firm and steady while the nut is being turned or screwed on.

I make the punch or upsetting-die of steel, of a cylindrical shape, or any other shape which convenience may suggest, as indicated in section at $j$, fig. 2, and secure it in the stock $j'$ by a set-screw, or by any other convenient means, so that it may pass through or work in the plunger or heading-die, as indicated in section in fig. 2.

I make the plunger or heading-die of steel, square in the cross-section, as shown at $k$, fig. 1, and indicated in section at $k$ $k$, fig. 2, and hollow, so as to allow the punch $j$ to work within it, and, with a suitable hemispherical concave in the end, as indicated in figs. 1 and 2, to give the usual shape to the head, or the concave may be of any other shape if it be desired to make a different-shaped head.

To the rear end of each of the connecting-bars $d'$ and $f'$, and also to the connecting-block $i'$, I joint a vibrating connecting-piece, as shown at $d$, $f$, and $i$, the rear ends of which are elevated by springs, as shown at $m$, $n$, and $o$, fig. 1, and when they are elevated, as shown at $d$, $f$, and $i$, fig. 1, the operating parts are out of gear, so that no duty can be performed by them.

I fit a lever, as shown at C, which I work on a fulcrum-pin, as $p$. To this lever, C, I attach a cross-bar, D, which carries three curved projections, the ends of which bear on the three jointed connecting-pieces, $d$, $f$, and $i$, two of which are shown at $r$ and $s$, fig. 1, and one in section at $r$, fig. 2, so that by pressing down the outer end of this lever, the projections, $r$, $s$, &c., will bear on the rear ends of the pieces $d$, $f$, and $i$, and depress them to the position shown at $i$, fig. 2, so as to correspond with the <-shaped projection on the sliding-block E, as shown at $t$, fig. 2, to bring the parts into gear for operation.

Having made and arranged the several parts of the machine, as before described, I put the machine in gear, as shown at $i$, $t$, fig. 2, by means of the lever C and its appendages. I then pass one end of the rod through the space H, between the ends of the holding and squaring-dies, and into the cavity in the plunger $k$, until it strikes the end of the punch or upsetting-die $j$, fig. 2, and revolve the main shaft B, by means of the driving-wheel G, in the direction indicated by the dart, or by any other suitable means, when the eccentric at $a$ will push forward the bar $d'$, and, by means of an inclined plane at its end (not seen) and force up the holding-die $e$, so that it will clasp the bolt or rod in the two semi-cylindrical spaces, like $w$, fig. 3, and hold it firmly while being upset and headed. The eccentric at $b$ will then force up the punch $j$, fig. 2, and upset the bolt or rod to the proper extent, when the two eccentrics at $a$ and $c$ will continue to force forward the two bars $d'$ and $f'$ until the inclined planes at $d''$ and $f''$ will force the squaring-dies $g$ and $h$ together, and square the portion between the holding-dies $e$ and $e'$, and the head, (being the part which has been upset,) and the eccentric $b$ will continue to force forward the punch $j$, and will also force forward the plunger $k$, and completely head the bolt, when, by the continued revolving motion of the shaft B, the eccentrics will draw back the bars $d'$ and $f'$, and the block $i'$, by means of suitable pins or dowels, working in suitable slots, and the holding-die $e$, and the squaring-dies $g$ and $h$, will be thrown back by suitable springs, one of which is shown at K, fig. 1, and the plunger or heading-die $k$ will be thrown back by the spring $v$, when the finished bolt may be taken out, and another rod inserted, and so on.

The principal advantage of my improvement consists in my method of upsetting and squaring the necessary portion of the rod or bolt in connection with heading it; as, by my machine, I can upset or swell that portion of the bolt to the desired size, so that each side of the square may be equal to the diameter of the rod or round part of the bolt, and, therefore, will serve to hold it steady and firm in the wood while turning or screwing on the nut.

What I claim as my invention, and desire to secure by Letters Patent, is—

The combination of the holding-dies $e$ and $e'$, and squaring-dies $g$ and $h$, with the upsetting-punch $j'$, and plunger or heading-die, $k$, when they are constructed, arranged, and operated, substantially as herein described and set forth.

FRANKLIN B. PRINDLE.

Witnesses:
  WM. F. MORTON,
  R. FITZGERALD.